United States Patent [19]

Nishikawa et al.

[11] Patent Number: 4,660,690

[45] Date of Patent: Apr. 28, 1987

[54] DIRECT-COUPLING CONTROL DEVICE FOR TORQUE CONVERTER FOR AUTOMATIC VEHICULAR TRANSMISSION

[75] Inventors: Masao Nishikawa, Tokyo; Yoshimi Sakurai, Tanashi; Takashi Aoki, Fujimi, all of Japan

[73] Assignee: Honda Giken Kogyo Kabushiki Kaisha, Tokyo, Japan

[21] Appl. No.: 661,836

[22] Filed: Oct. 17, 1984

[30] Foreign Application Priority Data

Oct. 17, 1983 [JP] Japan .................. 58-193903

[51] Int. Cl.$^4$ ........................ F16H 45/02; F16D 33/16
[52] U.S. Cl. .................... 192/3.31; 192/3.33; 192/103 F
[58] Field of Search ............... 192/0.032, 0.033, 0.076, 192/3.3, 3.31, 3.33, 103 F

[56] References Cited

U.S. PATENT DOCUMENTS

| | | | |
|---|---|---|---|
| 2,728,427 | 12/1955 | Lucia | 192/0.033 |
| 2,756,851 | 7/1956 | Collins | 192/0.076 X |
| 3,237,734 | 3/1966 | Jania | 192/0.032 |
| 3,810,531 | 5/1974 | Edmunds | 192/3.3 |
| 4,253,553 | 3/1981 | Yamada et al. | 192/0.076 X |
| 4,290,513 | 9/1981 | Nishimura et al. | 192/3.3 X |

Primary Examiner—Rodney H. Bonck
Assistant Examiner—Richard M. Lorence
Attorney, Agent, or Firm—Armstrong, Nikaido Marmelstein & Kubovcik

[57] ABSTRACT

A direct-coupling control device for a torque converter for an automatic vehicular transmission in which a valve controlling the locking force of a direct-coupling mechanism is provided with two independently-formed pressure chambers pushing a valve body in a direction in which a locking force is increased. The device is also provided with a first fluid pressure output connected to one of the pressure chambers, and a second fluid pressure output connected to the other. When the first fluid pressure is higher than the second fluid pressure, the first fluid pressure acts on the sum of the individual working areas of the first and second fluid pressures on the valve body. A reliable speed change control can be provided by the two fluid pressures, and the capacity characteristics of the direct-coupling mechanism can be selected optimally with respect to these fluid pressures. The locking force of the direct-coupling mechanism can be increased quickly in proportion to increasing vehicle speed, and fuel costs can be reduced very effectively.

6 Claims, 5 Drawing Figures

DIRECT-COUPLING CONTROL DEVICE FOR TORQUE CONVERTER FOR AUTOMATIC VEHICULAR TRANSMISSION

BACKGROUND OF THE INVENTION

1. Field of the Invention

This invention relates to a direct-coupling control device for a torque converter for an automatic vehicular transmission, and more particularly to a direct-coupling control device for a torque converter for an automatic vehicular transmission, consisting of a fluid torque converter provided with input and output members, a mechanism capable of mechanically and directly coupling the input and output members of the torque converter, a valve means inserted between the direct-coupling mechanism and a pressure supply source to control the locking force of the direct-coupling mechanism, a first fluid pressure output means which outputs a fluid pressure in accordance with the speed of the vehicle, and a second fluid pressure output means which outputs a fluid pressure in accordance with engine output.

2. Description of the Prior Art

It is known that, when the torque-amplifying function of a torque converter in a vehicle provided with an automatic transmission containing the torque converter is no longer necessary, the torque converter is mechanically coupled to reduce fluid slip losses which are peculiar thereto, and thereby improve the fuel economy. However, when this direct-coupling is performed when the vehicle is travelling at a low speed or the engine is in a low-rev region, the following defects occur. (1) First, the vehicle speed which enables the torque converter to reach its coupling point varies according to the torque applied while the vehicle is running. Therefore, when a small torque is applied, for example, while cruising at constant speed, the torque converter should be coupled after the vehicle speed at which no torque-amplifying function is required has been reduced to a low level. However, when the throttle pedal is then pressed, the vehicle speed enters the torque-amplifying region, so that it is necessary to release this direct-coupled state immediately. In this case, there is no choice but to increase the setting of the vehicle speed at which the torque-amplifying function is omitted, to prevent the occurrence of a time lag. (2) When the torque converter is coupled at a low vehicle speed, the engine vibrates greatly, so that suppressed noise is generated in the chassis. Although various types of torque absorbers have been proposed to prevent these defects, a device meeting all requirements has not yet been developed. Therefore, in order to prevent the generation of suppressed noise, there is no choice but to increase the setting of the vehicle speed at which the torque converter should be coupled. Under these circumstances, the torque converter is directly coupled only when the rotational speed of the engine (or, to be more precise, the vehicle speed, since a vehicle can be controlled more easily in practice if the actual speed ratio is converted into vehicle speed) is above a certain level.

One effective method of eliminating these defects and reducing fuel costs by operating a direct-coupling mechanism between the input and output members of a converter before the torque-amplifying function has been interrupted is the concept of the division of power, i.e. the concept of applying power to both a direct-coupling mechanism and a converter. The Assignee has previously proposed a simply-constructed direct-coupling mechanism capable of providing this power division very easily, which consists of a tapered member and a roller, and a control method therefore. In this proposed technique, the locking force (capacity) of the direct-coupling mechanism is increased in proportion to both the vehicle speed and the degree of opening of the throttle. For example, two signal pressures indicating the vehicle speed and the degree of opening of the throttle are input to a modulator valve through a high-selectivity valve. The sealability of the high-selectivity valve is high, so that no problems occur so long as it is operated normally. However, when hydraulic pressures are used as these signal pressures, and if dust should be mixed with the oil accidentally, oil leaks occur between the two signal pressures, so that the signal pressures become inaccurate. Accordingly, when these signal pressures are used as input signals for a speed-change control operation, errors occur.

In the previously-proposed technique, the pressure-receiving area of the modulator valve, which receives a signal pressure selected by the high-selectivity valve, is constant, irrespective of the signal pressure thus selected. Therefore, when the locking force characteristic of a direct-coupling mechanism is set to an optimum level with respect to the vehicle speed, it is not necessarily optimal with respect to the degree of opening of the throttle. Consequently, in order to set the locking force characteristic of a direct-coupling mechanism to a level that is satisfactory for vehicle speed as well as the degree of opening of a throttle, it is necessary to adjust the signal pressures again.

The locking force of the direct-coupling mechanism of the previously-proposed technique when the throttle pedal is pressed is constant in the low-speed region, irrespective of variations in the vehicle speed. A power-divided torque converter reaches its coupling point at a certain vehicle speed. At vehicle speeds lower than this vehicle speed, the torque-amplifying function provided increases as the vehicle speed decreases. Thus it is preferable that the locking force of the direct-coupling mechanism when the throttle pedal is pressed increases in proportion to the vehicle speed.

SUMMARY OF THE INVENTION

The present invention has been developed in view of these circumstances. An object of the present invention is to provide a direct-coupling control device for a torque converter for an automatic vehicular transmission which is an improvement on the device proposed previously by the Assignee and which is capable of preventing leakages occurring between two signal pressures, varying the pressure-receiving area of a valve means to enable the signal pressures to develop their powers individually with respect to the valve means, and increasing the locking force of a direct-coupling mechanism according to increasing vehicle speed when the engine is accelerated with the opening of the throttle at a constant level.

According to the present invention, the valve means controlling the locking force of the direct-coupling mechanism is provided with a pair of pressure chambers which are independent of each other and which push a valve body in a direction in which the locking force is increased. A first hydraulic pressure output means is connected to one pressure chamber while a second hydraulic pressure output means is connected to the other. When the first hydraulic pressure is higher than the second hydraulic pressure, the first hydraulic pressure acts on the sum of the individual working areas of the first and second hydraulic pressures with respect to the valve body.

These and other objects as well as advantageous features of the invention will become apparent from the following description of preferred embodiments thereof, taken in conjuction with the accompanying drawings.

BRIEF DESCRIPTION OF THE DRAWINGS

FIGS. 1-3 illustrate an embodiment of the present invention, wherein:

FIG. 1 is a schematic diagram of an automatic transmission with four forward stages and one reverse stage, to which the present invention is applied;

FIG. 2 is a diagram of a hydraulic pressure control circuit of the transmission; and FIG. 3 is a development of a principal portion of the direct-coupling clutch of FIG. 2.

DESCRIPTION OF THE PREFERRED EMBODIMENTS

Figure 1:
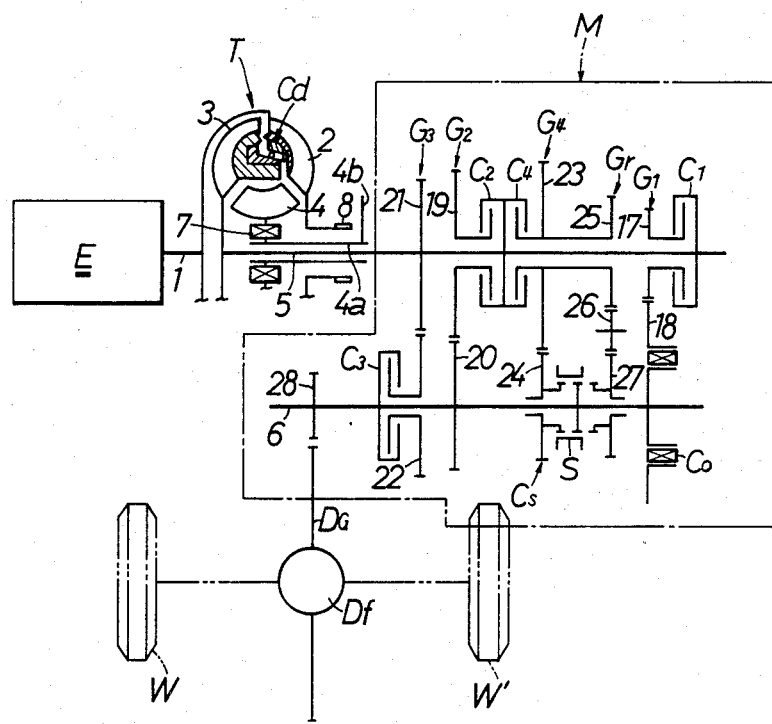

Embodiments of the present invention will now be described with reference to the drawings. First, referring to FIG. 1, which schematically shows the construction of an automatic vehicular transmission provided with four forward stages and one reverse stage, to which the present invention is applied, the output of an engine E is transmitted from a crankshaft 1 thereof to driving wheels W, W' through a torque converter T, an auxiliary transmission M, and a differential gear device Df, in that order, to drive the wheels.

The torque converter T consists of a pump rotor 2 connected to the crankshaft 1, a turbine rotor 3 connected to an input shaft 5 of the auxiliary transmission M, and a stator rotor 4 connected by a one-way clutch 7 to a stator shaft 4a supported on the input shaft 5 so that the stator shaft 4a can rotate relative thereto. The torque transmitted from the crankshaft 1 to the pump rotor 2 is sent hydrodynamically to the turbine rotor 3. If the torque-amplifying function is performed during this time, the stator rotor 4 bears the reactive force thereof in a known manner.

A pump-driving gear 8 driving a hydraulic pump P (shown in FIG. 2) is provided at the right-hand end of the pump rotor 2, and a stator arm 4b controlling a regulator valve Vr (shown in FIG. 2) is fixed to the right-hand end of the stator shaft 4a.

A roller type of direct-coupling clutch Cd is provided between the pump rotor 2 and the turbine rotor 3 as a direct-coupling mechanism capable of connecting these two rotors together mechanically. The direct-coupling clutch Cd will now be described in detail with reference to FIGS. 2 and 3. An annular driving member 10 provided with a conical driving surface 9 on its inner circumferential side is spline-fitted to an inner circumferential wall 2a of the pump rotor 2. A driven member 12 provided on its outer circumferential side with a conical driven surface 11 facing and extending parallel to the conical driving surface 9 is spline-fitted to an inner circumferential wall 3a of the turbine rotor 3 in such a manner that the driven member 12 can slide in the axial direction. A piston 13 is formed at one end of the driven member 12, integrally therewith, and fits slidably in a hydraulic cylinder 14 provided in the inner circumferential wall 3a of the turbine rotor 3. The piston 13 simultaneously receives the internal pressures in the cylinder 14 and the torque converter T at its left and right end surfaces, respectively.

Figure 3:
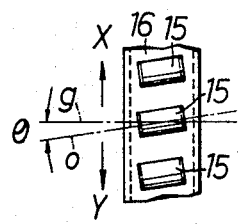

Cylindrical clutch rollers 15 are provided between the conical driving surface 9 and the driven surface 11. The clutch rollers 15 are held on an annular retainer 16 in such a manner that an axis o of each clutch roller 15 is inclined at a predetermined angle $\theta$ with respect to a generatrix g of an imaginary conical surface Ic (FIG. 2) extending between the conical surfaces 9, 11 as shown in FIG. 3.

Accordingly, when a hydraulic pressure higher than the internal pressure in the torque converter T is introduced into the hydraulic cylinder 14 during a range in which the torque-amplifying function of the torque converter T is unnecessary, the piston 13, i.e. the driven member 12, is moved toward the driving member 10. Consequently, the clutch rollers 15 are pressed against the two conical surfaces 9, 11. When the driving member 10 is then rotated with respect to the driven member 12 in the direction X of FIG. 3 by the output torque of the engine E, the clutch rollers 15 rotate about their own axes. This rotational movement of the clutch rollers 15 produces a relative displacement of the two members 10, 12 in the axial direction in such a manner that they approach each other, since the axis o of each of the clutch rollers 15 is inclined as described above. As a result, the clutch rollers 15 bite into the two conical surfaces 9, 11 to provide a mechanical connection between the members 10, 12, i.e., the pump rotor 2 and the turbine rotor 3. When the output torque of the engine E exceeds the connection force of the direct-coupling clutch Cd applied between the rotors 2, 3 even during this operation of the clutch Cd, the clutch rollers 15 slip over the conical surfaces 9, 11, so that this torque is divided into two parts. One part of the torque is transmitted mechanically through the direct-coupling clutch Cd, and the other part thereof hydrodynamically through the rotors 2, 3, to form a variable power-dividing system in which the ratio of the first part of the torque to the second part thereof varies with the slippage of the clutch rollers 15.

When a reverse load is applied to the torque converter T with the direct-coupling clutch Cd operating, the rotational speed of the driven member 12 becomes higher than that of the driving member 10. Consequently, the driving member 10 rotates relative to the driven member 12 in the direction Y. This makes the clutch rollers 15 rotate about their own axes in the direction opposite to the previous direction, so that the members 10, 12 are displaced relatively in the axial direction and are separated from each other. As a result, the clutch rollers 15 are released from the conical surfaces 9, 11 and are left in an idly rotating state. Therefore, the transmission of the reverse load from the turbine rotor 3 to the pump rotor 2 is done hydrodynamically only.

When the hydraulic pressure operating the hydraulic cylinder 14 is no longer supplied, the piston 13 receives the internal pressure in the torque converter T and moves back to its original position, so that the direct-coupling clutch Cd is disengaged.

Referring again to FIG. 1, a first speed stage gear train $G_1$, a second speed stage gear train $G_2$, a third speed stage gear train $G_3$, a fourth speed stage gear train $G_4$ and a reverse gear train Gr are provided parallel to one another between the parallel input and output shafts 5, 6 of the auxiliary transmission M. The first speed stage gear train $G_1$ consists of a driving gear 17 connected to the input shaft 5 by a first speed stage clutch $C_1$, and a driven gear 18 which meshes with the gear 17 and which can be connected to the output shaft 6 by a one-way clutch $C_0$. The second speed stage gear train $G_2$ consists of a driving gear 19 which can be connected to the input shaft 5 by a second speed stage clutch $C_2$, and a driven gear 20 attached to the output shaft 6 and which meshes with the gear 19. The third speed stage gear train $G_3$ consists of a driving gear 21 mounted attached to the input shaft 5, and a driven gear 22 connected to the output shaft 6 by a third speed clutch $C_3$ and which meshes with the gear 21. The fourth speed stage gear $G_4$ consists of a driving gear 23 connected to the input shaft 5 by a fourth speed clutch $C_4$, and a driven gear 24 connected to the output shaft 6 by a change-over clutch Cs and which meshes with the gear 23. The reverse gear train Gr consists of a driving gear 25 provided integrally with the driving gear 23 of the fourth speed stage gear train $G_4$, a driven gear 27 connected to the output shaft 6 by the change-over clutch Cs, and an idle gear 26 meshing with the gears 25, 27. The change-over clutch Cs is provided between the driven gears 24, 27, and is able to connect these driven gears 24, 27 selectively to the output shaft 6 by the shifting of a selector sleeve S of the clutch Cs to a forward position to the left in the drawing or to a reverse position to the right therein. The one-way clutch $C_0$ transmits only the driving torque from the engine E, and does not transmit torque applied thereto in the opposite direction.

When the first speed stage clutch $C_1$ alone is engaged with the selector sleeve S held in the forward position as shown in the drawing, the driving gear 17 is connected to the input shaft 5 to establish the first speed stage gear train $G_1$, so that torque is transmitted from the input shaft 5 to the output shaft 6 through the gear train $G_1$. When the second speed stage clutch $C_2$ is engaged while the first speed stage clutch $C_1$ is still engaged, the driving gear 19 is connected to the input shaft 5 to establish the second speed stage gear train $G_2$, by which torque is transmitted from the input shaft 5 to the output shaft 6. Although the first speed stage clutch $C_1$ is also engaged during this time, the second speed stage gear train not the first speed stage gear train is established, because of the operation of the one-way clutch $C_0$. The same applies to the case in which the fourth speed stage clutch $C_4$ is engaged while the third speed stage clutch $C_3$ is still engaged. When the second speed stage clutch $C_2$ is disengaged and the third speed stage clutch $C_3$ engaged, the driven gear 22 is connected to the output shaft 6 to establish the third speed stage gear train $G_3$. When the third speed stage clutch $C_3$ is disconnected and the fourth speed stage clutch $C_4$ connected, the driving gear 23 is connected to the input shaft 5 to establish the fourth speed stage gear train $G_4$. When the selector sleeve S for the changeover clutch Cs is moved to the right to engage the fourth speed stage clutch $C_4$ alone, the driving gear 25 is connected to the input shaft 5, and the driven gear 27 to the output shaft 6, to establish the reverse gear train Gr, by which reverse torque is transmitted from the input shaft 5 to the output shaft 6.

The torque transmitted to the output shaft 6 is transferred from an output gear 28 provided on an end portion thereof to a larger-diameter gear $D_G$ in the differential gear device Df.

Figure 2:
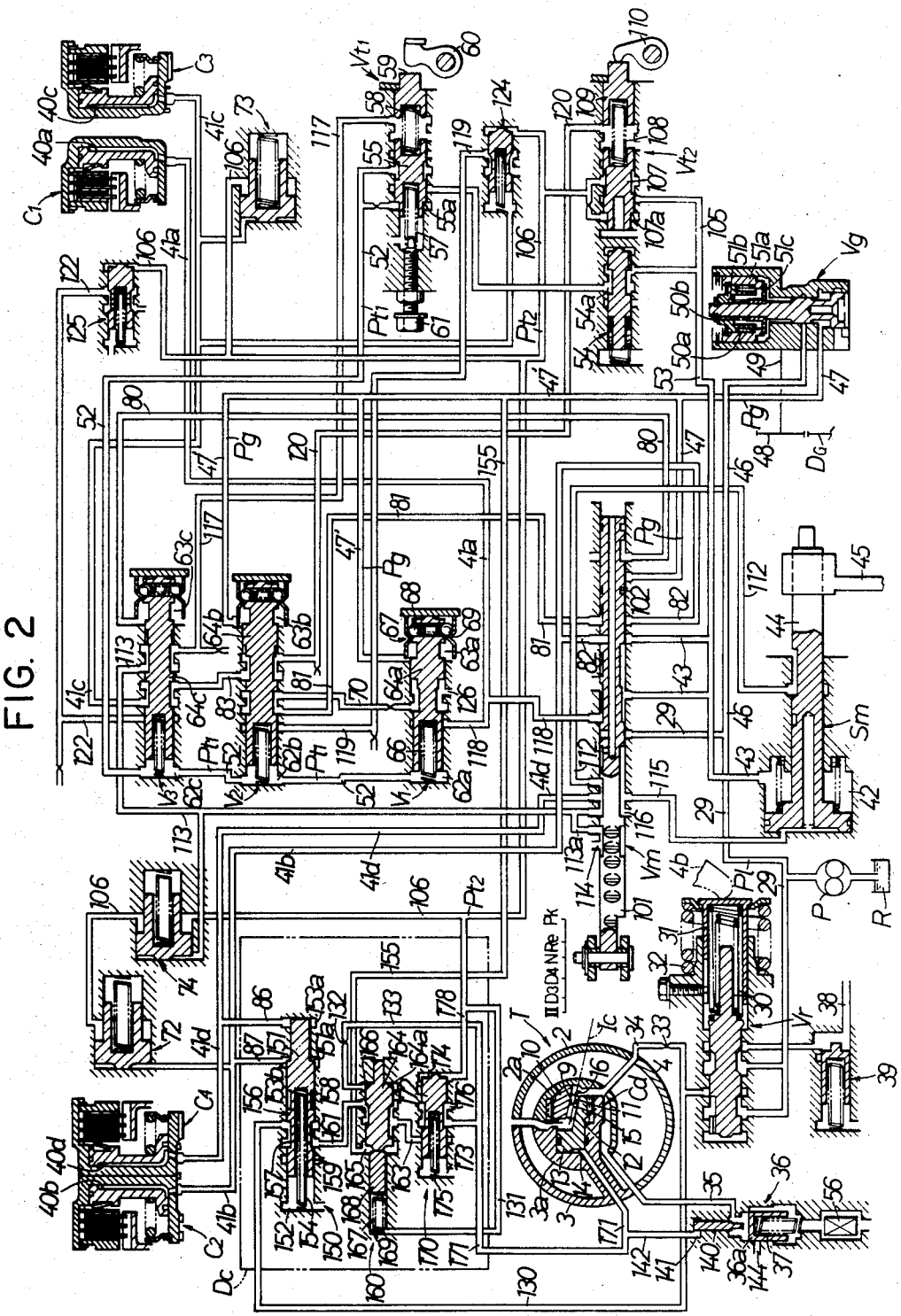

Referring to FIG. 2, a hydraulic pump P sucks up oil from an oil tank R and sends it under pressure into a hydraulic oil passage 29. The pressure of this oil is regulated to a predetermined pressure by a regulator valve Vr, and is then sent to a manual valve Vm which acts as a manual change-over valve. This hydraulic pressure is called the "line pressure Pl".

The regulator valve Vr is provided with a pressure-regulating spring 30 and a cylindrical spring seat 31 supporting the outer edge of the spring 30. The cylindrical spring seat 31 can be moved to the right or left to regulate the set load on the pressure-regulating spring 30. The stator arm 4b is in contact with the outer surface of the cylindrical spring seat 31 so that it applies thereto the reactive force acting on the stator rotor 4, i.e. the stator reactive force. A stator spring 32 receiving the stator reactive force is connected to the cylindrical spring seat 31, so that as the stator reactive force increases, the stator spring 32 contracts, and the cylindrical spring seat 31 is moved to the left to increase the set load on the pressure-regulating spring 30. Consequently, the line pressure Pl in the hydraulic oil passage 29 increases.

Part of the hydraulic oil, whose pressure has been regulated by the regulator valve Vr, is introduced into the torque converter T through an inlet oil passage 34 provided with a restriction 33, to increase the pressure therein and thus prevent the generation of cavitation therein. A pressure-retaining valve 36 acting as an internal pressure control means is provided in an outlet oil passage 35 of the torque converter T. The oil passing through the pressure-retaining valve 36 returns to the oil tank R through an oil cooler 56.

The excess hydraulic oil discharged from the hydraulic pump P is introduced from the regulator valve Vr to a lubricating oil passage 38, from where it is sent to various lubrication portions. In order to ensure the necessary minimum hydraulic pressure during this time, a pressure-regulating valve 39 is connected to the lubricating oil passage 38.

A manual valve Vm can be shifted in accordance with the operation of a speed change lever (not shown) to six positions: a parking position Pk, a reverse position Re, a neutral position N, an automatic 4-step forward speed-changing position $D_4$, an automatic 3-step forward speed-changing position $D_3$ (excluding the fourth speed stage), and a second cruising position II. When the valve Vm is in the neutral position N in the drawing, the hydraulic oil sent thereto is not supplied to any of the clutches $C_1$, $C_2$, $C_3$, $C_4$ or any of the various hydraulically-operated parts. Accordingly, all the clutches $C_1$, $C_2$, $C_3$, $C_4$ are disengaged, and the torque of the engine E is not transmitted to the driving wheels W, W'.

When the manual valve Vm is shifted from the neutral position N one step to the left in the drawing to the automatic 4-step forward speed-changing position $D_4$, the hydraulic oil passage 29 extending from the hydraulic pump P is connected to the oil passages 43, 118, and a hydraulic oil passage 41a communicating with a hydraulic cylinder 40a for the first speed stage clutch $C_1$ is connected to the oil passage 29 through the oil passage 118. An oil passage 47 is connected to an oil passage 80, and an oil passage 81 to an oil passage 82 which communicates with a hydraulic cylinder 40b for the fourth speed stage clutch C$_2$. The oil passages 113a, 113 are isolated from a discharge oil passage 114 and an oil passage 112, and an oil passage 115 remains connected to a discharge port 116. The oil passage 43 is connected to a spring chamber 42 in a servomotor Sm, which is used to shift the selector sleeve S (see FIG. 1). Accordingly, a piston 44 in the servomotor Sm is kept by a shift fork 45 in a left-hand position, shown in the drawing, to retain the selector sleeve S in the forward position shown in FIG. 1. Consequently, the driven gear 24 is connected to the output shaft 6, and the driven gear 27 is free to rotate idly around the output shaft 6 with the reverse gear train Gr disengaged.

When the manual valve Vm is shifted to the automatic 3-step forward speed-changing position D$_3$, the same results are obtained as when the manual valve Vm is shifted to the automatic 4-step forward speed-changing position D$_4$, except that the oil passage 80 is isolated from the oil passage 47. The oil passage 81 seems to be isolated from the oil passage 82 but these passages 81, 82 are connected to each other in practice by an annular groove 102 provided in a spool valve body 101 of the manual valve Vm.

An input oil passage 46, which is connected to the input port of a governor valve Vg constituting a first hydraulic pressure output means, branches off the hydraulic oil passage communicating with the hydraulic pump P, and an oil passage 47 extends from the output port of the valve Vg. The governor valve Vg is a well-known valve which is rotated about its own rotary shaft 49 by a gear 48 meshing with the larger-diameter gear D$_G$ of the differential gear device Df. A pair of springs 50a, 50b are urged in a valve-opening direction by the centrifugal force applied to three weights 51a, 51b, 51c by the rotary movement of the valve Vg, and are urged in a valve-closing direction by the hydraulic pressure from the oil passage 47, but can be urged in the valve-opening direction so as to display the desired characteristics of the valve Vg. This governor valve Vg ensures that a hydraulic pressure proportional to the vehicle speed, i.e., a governor pressure Pg, can be output into the oil passage 47.

When the manual valve Vm is in the automatic 4-step forward speed-changing position D$_4$ or the automatic 3-step forward speed-changing position D$_3$, an oil passage 53 branches off the oil passage 43 to which hydraulic pressure is applied from the hydraulic pump P, and is connected to a first throttle valve Vt$_1$ by a modulator valve 54 and to a second throttle valve Vt$_2$, which acts as a second hydraulic pressure output means, through an oil passage 105.

The modulator valve 54 is a pressure-reducing valve which is formed so that it is urged in the closing direction by the force of a spring and in the opening direction by a modulator pressure from an output port 54a. The valve 54 defines an upper limit for the input pressure in a first throttle valve Vt$_1$.

The first throttle valve Vt$_1$ is a known valve, and is provided with a spool valve body 55, a control spring 58 urging the valve body 55 to the left, a return spring 57 urging the valve body 55 to the right, a control piston 59 supporting the outer end of the control spring 58, a control cam 60 which rotates in accordance with an increase in the opening of the throttle valve of the engine E and moves the control piston 59 to the left accordingly, and an adjustment bolt 61 which is able to regulate a set load on the return spring 57. When the control piston 59 is moved to the left, the force generated by the displacement thereof is transmitted to the spool valve body 55 through the control spring 58 to press it to the left. When the spool valve body 55 is thus moved leftward, the hydraulic pressure output to the oil passage 52 acts on a left shoulder 55a thereof so as to press the spool valve body 55 back in the rightward direction. Consequently, a hydraulic pressure proportional to the opening of the throttle valve in the engine E, i.e., a first throttle pressure Pt$_1$, is output from the first throttle valve Vt$_1$ to the oil passage 52. A counterclockwise pivotal movement of the control cam 60 continuously reduces the degree of communication between a drain oil passage 117 and the oil tank R.

The second throttle valve Vt$_2$ is provided with a spool valve body 107 between the oil passages 105, 106, a control spring 108 urging the valve body 107 to the left, a control piston 109 supporting the outer end of the control spring 108, and a control cam 110 which rotates in accordance with an increase in the opening of the throttle valve of the engine E and moves the control piston 109 to the left accordingly. When the control piston 109 is moved to the left, the force generated by the displacement thereof is transmitted to the spool valve body 107 by the control spring 108 to move it to the left as well. The hydraulic pressure output to the oil passage 106 when the spool valve body 107 is moved leftward acts on a left shoulder 107a thereof so as to press the valve body 107 back toward the right. Because of this operation, a second throttle pressure Pt$_2$ which is proportional to the degree of opening of the throttle valve of the engine E is output from the second throttle valve Vt$_2$ to the oil passage 106.

The oil passage 52 into which the first throttle pressure Pt$_1$ is introduced from the first throttle valve Vt$_1$ communicates with first pilot hydraulic pressure chambers 62a, 62b, 62c in a 1-2 shift valve V$_1$, a 2-3 shift valve V$_2$, and a 3-4 shift valve V$_3$, respectively. An oil passage 47', which branches off the oil passage 47, to which a governor pressure Pg is introduced from the governor valve Vg, communicates with second pilot hydraulic pressure chambers 63a, 63b in the 1-2 shift valve V$_1$ and the 2-3 shift valve V$_2$, respectively. When the manual valve Vm is in the automatic 4-step forward speed-changing position D$_4$, an oil passage 80, which can be connected to the oil passage 47 by the manual valve Vm, communicates with a second pilot hydraulic pressure chamber 63c in the 3-4 shift valve V$_3$. Consequently, spool valve bodies 64a, 64b, 64c of the shift valves V$_1$, V$_2$, V$_3$ receive the first throttle pressure Pt$_1$ at both ends thereof, so that they operate as follows.

The spool valve body 64a of the 1-2 shift valve V$_1$ initially stays at its right-hand position in the drawing because of the force of a spring 66, and an oil passage 118 is shut off from an oil passage 70. Since the oil passage 118 is connected to the hydraulic oil passage 41a during this time, the first speed stage clutch C$_1$ is engaged under pressure, so that the first speed stage gear train G$_1$ is established.

When the vehicle speed then increases, the governor pressure Pg increases. When the force moving the spool valve body 64a to the left, which is based on the governor pressure Pg, exceeds the rightward force thereof, which is based on the first throttle pressure Pt$_1$ and the force of the spring 66, click balls 68 which move with the valve body 64a within a click motion mechanism 67 provided at the right-hand end of the valve body 64a, run over a fixed projection 69, so that the valve body 64a is shifted to its left-hand position resulting in the oil passage 118 communicating with the oil passage 70. The oil passage 70 is shut off from a drain oil passage 126. When the 2-3 shift valve $V_2$ is in the position shown in the drawing, in this state, the oil passage 70 is connected to the oil passage 81 which communicating with the oil passage 82. Since the oil passage 82 is connected to the hydraulic oil passage 41b which communicates with the hydraulic cylinder 40b in the second speed stage clutch $C_2$, the second speed stage clutch $C_2$ is engaged under pressure to establish the second speed stage gear train $G_2$.

When the vehicle speed increases further, the spool valve body 64b in the 2-3 shift valve $V_2$ moves to the left connecting the oil passage 81 to a drain oil passage 119 and the oil passage 70 to the oil passage 83, and disconnecting the oil passage 83 and a drain oil passage 120. Consequently, the second speed stage clutch $C_2$ is disengaged. On the other hand, when the 3-4 shift valve $V_3$ is in the position shown in the drawing, the oil passage 83 is connected to the hydraulic oil passage 41c which communicates with the hydraulic cylinder 40c in the third speed stage clutch $C_3$. Accordingly, the third speed stage clutch $C_3$ is connected under pressure to establish the third speed stage gear train $G_3$.

When the vehicle speed increases further with the manual valve Vm in the automatic 4-step forward speed-changing position $D_4$, the spool valve body 64c moves to the left, since the governor pressure Pg acts on the interior of the second pilot hydraulic chamber 63c in the 3-4 shift valve $V_3$ through the oil passage 80. As a result, the hydraulic oil passage 41c communicates with a drain oil passage 122 to disengage the third speed stage clutch $C_3$. At the same time, an oil passage 113 is shut off from a drain oil passage 117 and connected to the oil passage 83. The oil passage 113 is connected to the hydraulic oil passage 41d by the manual valve Vm, and the hydraulic oil passage 41d is connected to the hydraulic cylinder 40d in the fourth speed stage clutch $C_4$. Accordingly, the fourth speed stage clutch $C_4$ is engaged under pressure to establish the fourth speed stage gear train $G_4$.

When the manual valve Vm is in the automatic 3-step forward speed-changing position $D_3$, the oil passage 80 is shut off from the oil passage 47 by the manual valve Vm, so that the force moving the spool valve body 64c to the left is not applied thereto. Accordingly, the fourth speed stage clutch $C_4$ is not engaged, and the fourth speed stage gear train $G_4$ is not established.

In order to reduce any shock during a speed change, accumulators 72, 73, 74 are provided, a 1-2 orfice control valve 124 is provided in the drain oil passage 119, and a 2-3 orifice control valve 125 is provided in the drain oil passage 122.

When the vehicle speed is decelerating, the spool bodies 64a, 64b, 64c in the 3-4 shift valve $V_3$, 2-3 shift valve $V_2$, 1-2 shift valve $V_1$, respectively, move to the right in that order; and when the vehicle stops, the change-speed transmission returns to the first speed stage. When the manual valve Vm is in the second speed-retaining position II, the oil passage 118 is shut off from the oil passage 29 and is connected to the oil tank R, and the oil passage 82 communicates with the oil passage 43 through an annular groove 102. The second speed stage clutch $C_2$ alone is connected under pressure to retain the second speed stage. When the manual valve Vm is in the reverse position Re, the oil passage 43 is connected to the oil tank R, the oil passage 115 is shut off from the discharge oil passage 116 and connected to the oil passage 29, and pressure is applied to the spring chamber 42 in the servomotor Sm. As a result, the piston 44 moves to the right to displace the selector sleeve S (see FIG. 1) to the right and establish the reverse gear train Gr. At the same time, the hydraulic pressure in the oil passage 112 increases, and this pressure is introduced into the hydraulic oil passage 41d through the manual valve Vm. Consequently, the fourth speed stage clutch $C_4$ is connected under pressure to enable the vehicle to reverse.

The construction of a control means Dc controlling the operation of the direct-coupling clutch Cd will now be described with reference to FIG. 2. This control means Dc is provided with three valves 150, 160, 170. The three valves 150, 160, 170 need only be connected in series, the order of their connection is not important.

The valve 150 is an unlocking valve releasing the transmission from the locking force when the vehicle speed changes. The valve 150 is provided with a spool valve body 151 moving between a first shift position on the right-hand side and a second shift position on the left-hand side, a first pilot hydraulic pressure chamber 152 facing the left-hand end surface of the valve body 151, a second pilot hydraulic pressure chamber 153a facing the right-hand end surface of the valve body 151, a third pilot hydraulic pressure chamber 153b facing a stepped portion 151a provided on the right-hand side of the valve body 151, and a spring 154 urging the valve body 151 to the right. The first pilot hydraulic pressure chamber 152 communicates with the oil tank R. The oil passage 86 which branches off the hydraulic oil passage 41d extending to the fourth speed stage clutch $C_4$ communicates with the second pilot hydraulic pressure chamber 153a. The oil passage 87 which branches off the hydraulic oil passage 41b extending to the second speed stage clutch $C_2$ communicates with the third pilot hydraulic pressure chamber 153b. The area of the surface of the valve body 151 facing the second pilot hydraulic pressure chamber 153a and that of the surface thereof facing the third pilot hydraulic chamber 153b are substantially the same. Two annular grooves 157, 158 are provided in a symmetrical relationship in portions of the outer circumferential surface of the valve body 151 on either side of a land 156. When the valve body 151 is in the first shift position, shown in the drawing, an oil passage 130, which introduces oil of a pressure regulated by the regulator valve Vr to the valve 150, communicates with an output oil passage 161 extending to the valve 160. This relationship between the oil passages 130, 161 is the same when the valve body 151 is in the second shift position on the left-hand side. However, when the valve body 151 is in an intermediate position in which the valve body 151 is moving between the first and second shift positions, the output oil passage 161 is shut off temporarily from the oil passage 130 and is connected to an oil passage 159 which communicates with the oil tank R.

The valve 160 is a modulator valve provided between the output oil passage 161 and an oil passage 163. The valve 160 is provided with a spool valve body 164 moving between a closed position on the left-hand side and an open position on the right-hand side, a first pilot hydraulic chamber 165 constituting one pressure chamber facing the left-hand end surface of the valve body 164, a second pilot hydraulic chamber 166 facing a right shoulder 164a provided at the right-hand end of the valve body 164, a plunger 168 extending into the first pilot hydraulic chamber 165 so as to come into contact with the valve body 164, a third pilot hydraulic chamber 169 constituting another pressure chamber facing the left-hand end surface of the plunger 168, and a spring 167 housed in the third pilot hydraulic chamber 169. The oil passage 155 into which the governor pressure Pg is introduced from the governor valve Vg communicates with the first pilot hydraulic chamber 165, so that the governor pressure Pg is introduced to the first pilot hydraulic chamber 165. The oil passage 131, which branches off the oil passage 106 via passage 178 into which the second throttle pressure $Pt_2$ is introduced from the second throttle valve $Vt_2$, communicates with the third pilot hydraulic chamber 169, so that the second throttle pressure $Pt_2$ is applied to the third pilot hydraulic chamber 169. The second pilot hydraulic chamber 166 communicates with an oil passage 171 through which hydraulic pressure is introduced to the direct-coupling clutch Cd via an oil passage 133 provided with a restriction 132. Accordingly, the hydraulic pressure for actuating or connecting the direct-coupling clutch Cd is introduced to the second pilot hydraulic chamber 166.

The oil passage 163 may be connected to the second pilot hydraulic chamber 166. The spring 167 is used to correct the connection force of the direct-coupling clutch Cd so that it can be provided only if needed. When the connection force of the direct-coupling clutch Cd is too large, the spring is arranged so as to urge the spool valve body 164 in the open direction.

The spool valve body 164 in the modulator valve 160 is opened in proportion to the degree of opening of the throttle, i.e., the second throttle pressure $Pt_2$. When the second throttle pressure $Pt_2$ is lower than the governor pressure Pg, the plunger 168 is separated from the spool valve body 164, so that the spool valve body 164 is not influenced by the second throttle pressure $Pt_2$. Namely, the governor pressure Pg acts on the sum of those individual areas of the spool valve body which are acted on by the governor pressure Pg and second throttle pressure $Pt_2$.

The valve 170 includes a spool valve body 172 which is provided between the oil passage 163 and an oil passage 171 which communicates with the hydraulic cylinder 14 in the direct-coupling clutch Cd, and which moves between a closed position on the right-hand side and an open position on the left-hand side, a first pilot hydraulic pressure chamber 173 facing the left-hand end surface of the valve body 172, a second pilot hydraulic pressure chamber 174 facing the right-hand end surface of the valve body 172, and a spring 175 urging the valve body 172 in the closed direction. The first pilot hydraulic pressure chamber 173 communicates with the oil tank R, and the second pilot hydraulic chamber 174 with the oil passage 106 through the oil passage 178. When the pressure in the second pilot hydraulic pressure chamber 174, i.e., the second throttle pressure $Pt_2$, is smaller than the resilient force of the spring 175, the valve 170 is closed as shown in the figure, and the hydraulic pressure in the hydraulic cylinder 14 in the direct-coupling clutch Cd is applied to the oil tank R through the oil passage 171 and a discharge port 176. When the second throttle pressure $Pt_2$ exceeds the resilient force of the spring 175, the valve body 172 moves to the left, and the input oil passage 163 communicates with the oil passage 171, so that the direct clutch Cd is engaged. Thus, when the opening of the throttle corresponds to an idling position, the direct-coupling clutch Cd is disengaged, i.e., unlocked, by the valve 170.

In the pressure-retaining valve 36 provided in the output passage 35 which connects the torque converter T and the oil tank R, a valve body 36a is urged in the valve-closing direction by a spring 37, an urging member, and in the valve-opening direction by the pressure on the upstream side of the output oil passage 35, i.e., the internal pressure of the torque converter T. A plunger 140 which can engage with the upstream end portion (the upper end portion in FIG. 2) of the valve body 36a is provided so as to urge the valve body 36a in the valve-opening direction. An oil passage 142 branching from the oil passage 171, through which the working oil pressure is introduced to the direct-coupling clutch Cd, communicates with a pressure-acting chamber 141 facing the end portion of the plunger 140 on the opposite side of the valve body 36.

The operation of this embodiment will now be described. The connection force of the direct-coupling clutch Cd is determined by the difference between the hydraulic oil pressure from the oil passage 171 and the internal pressure of the torque converter T. Accordingly, when the connection force of the direct-coupling clutch Cd must be increased, i.e., when the vehicle is running at high speed, it is desirable that the internal pressure of the torque converter T is reduced. The plunger 140 opens the pressure-retaining valve 36 and reduces the internal pressure of the torque converter T when the vehicle speed increases, to meet these requirements. Namely, when the vehicle speed has increased to a sufficiently high level so that the pressure in the oil passage 171 increases, the valve body 36a of the pressure-retaining valve 36 is pressed down to open it by the plunger 140. Consequently, the internal pressure of the torque converter T decreases, and the connection force of the direct-coupling clutch Cd increases further. In such a case, the quantity of heat generated within the torque converter T is extremely small, and the necessity of operating the oil cooler 56 is reduced. When the valve body 36a of the pressure-retaining valve 36 is pressed further down, the greater part of the oil from the torque converter T is discharged into the oil tank R directly, through the discharge oil passage 144. When the throttle pedal is then returned to the idling position, or when the vehicle speed then changes, it is necessary that the direct-coupling clutch Cd be disengaged. The disconnection of the direct-coupling clutch Cd is done by the internal pressure of the torque converter pushing back the piston 13. Accordingly, in order to improve the response of this clutch disengagement, it is necessary that the internal pressure of the torque converter T be increased, because it would raise problems if left low. However, the valve body 36a of the pressure-retaining valve 36 is released from the force of the plunger 140 as the hydraulic pressure in the oil passage 171 decreases, so that the internal pressure of the torque converter T increases, and the clutch Cd can be disengaged reliably. Since the valve body 36a and the plunger 140 are independent of each other, the pressure in the oil passage 171 cannot exceed that at the upper portion of the valve body 36a until the vehicle speed has increased to a certain level, so that the internal pressure of the torque converter can be maintained in a high predetermined level.

Figure 4:
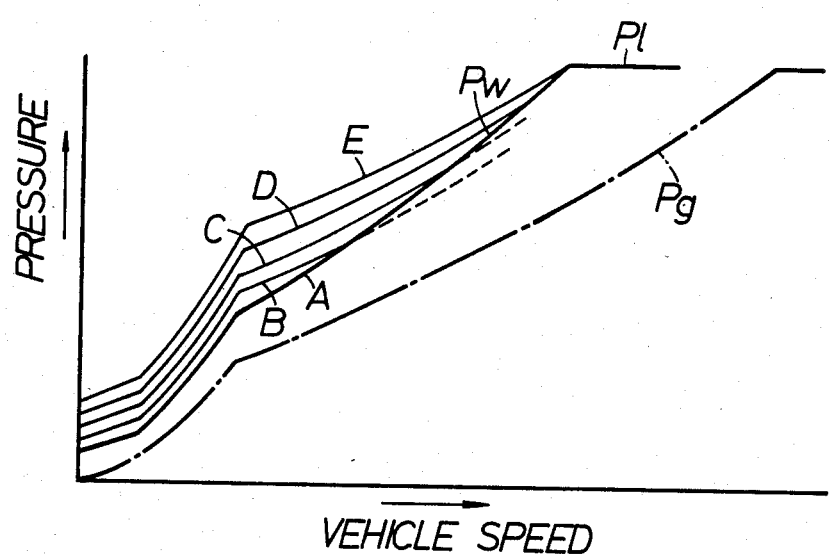
FIG. 4 is a graph of the characteristics of the working hydraulic pressure in the direct-coupling clutch.

The characteristics of the working pressure applied to the direct-coupling clutch Cd are shown in FIG. 4. Namely, the governor pressure Pg increases in proportion to the vehicle speed, and the working pressure Pw increases in proportion to the vehicle speed, as shown by the bold solid line A, when the opening of the throttle valve corresponds to idling.

Figure 5:
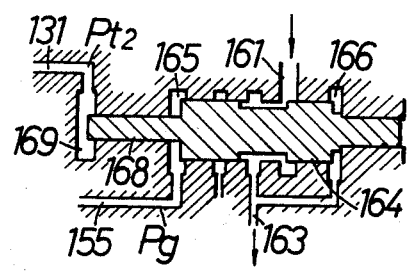
FIG. 5 is a section through principal portions of an example to compare with the present invention.

In the valve 160 with these working pressure Pw characteristics, the first pilot hydraulic pressure chamber 165 and the third hydraulic pressure chamber 169 are formed independently of each other, so that the governor pressure Pg and second throttle pressure $Pt_2$ are not mixed with each other. This means that no leakage between the governor pressure Pg and the second throttle pressure $Pt_2$ occurs, and no incorrect values are indicated. This enables a reliable speed change control. The area of the pressure-receiving surface of the plunger 168 can be determined irrespective of or independently of that of the pressure-receiving surface of the spool valve body 164 facing the first pilot hydraulic chamber 165. Accordingly, the characteristics of the connection force of the direct-coupling clutch Cd can be selected optimally with respect to both the governor pressure Pg and the second throttle pressure $Pt_2$. When the diameter of the plunger 168 is smaller than that of the spool valve body 164, the spool valve body 164 can be pushed in the valve-opening direction by the governor pressure Pg to an extent that corresponds to the difference between the areas of the pressure-receiving surfaces thereof. Therefore, the preferable characteristic in that the connection force of the direct-coupling clutch Cd increases in proportion to the vehicle speed can be produced. Moveover, when the governor pressure Pg is higher than the second throttle pressure $Pt_2$, the area of the surface of the spool valve body 164 on which the governor pressure Pg acts is increased by the addition of the area of the corresponding surface of the plunger 168. This means that, in this region, the connection force of the direct-coupling clutch Cd can be increased earlier in accordance with an increase in the vehicle speed, and fuel costs can be reduced very effectively. In case it is aimed to increase the connection force of the direct-coupling clutch Cd proportionately to the increase of the vehicle speed, such example may be contemplated as shown in FIG. 5, in which a plunger 168 and a spool valve body 164 are integrally formed. According to this example, however, working pressures Pw increase only in the manner shown by the thin lines B, C, D, E in FIG. 4 as the opening of the throttle valve increases. It would therefor be apparent that the invention is superior to the structure of FIG. 5 in reducing the fuel consumption by strengthening the engaging force of the clutch Cd at a higher ratio to the vehicle speed.

According to the present invention described above, a valve means controlling the locking force of a direct-coupling mechanism is provided with a pair of pressure chambers which are independent of each other and which are used to push a valve body in the direction in which a locking force increases, a first fluid pressure output means is connected to one pressure chamber, and a second fluid pressure output means is connected to the other pressure chamber. This means that the first and second fluid pressures are not mixed with each other, and a reliable speed change control can be provided by these two fluid pressures. Since the working areas of the two pressure chambers with respect to the valve body can be set independently of each other, the capacity characteristics of the direct-coupling mechanism can be selected optimally with respect to the two fluid pressures. In addition, the valve body can also be pushed in the valve-opening direction by the first fluid pressure to an extent that corresponds to the difference between the working areas of the two fluid pressures on the valve body. Accordingly, the locking force of the direct-coupling mechanism can be increased in proportion to increasing vehicle speed. Moreover, the valve means is so formed that, when the first fluid pressure is higher than the second fluid pressure, the former acts on the sum of the individual working areas of the first and second fluid pressures on the valve body. Therefore, the locking force of the direct-coupling mechanism can be increased early, and fuel costs can be reduced very effectively.

The present invention is not, of course, limited to the above embodiment, it can be modified in various ways within the scope of the appended claim.

What is claimed is:

1. A direct-coupling control device for a torque converter in an automatic vehicular transmission having a fluid torque converter provided with an input member and an output member and a direct-coupling mechanism capable of mechanically coupling said input and output members of the torque converter together, said direct-coupling control device comprising:

a valve means disposed in a line connecting between said direct-coupling mechanism and a pressure supply source to control a supply of fluid pressure to said direct-coupling mechanism;

a first fluid pressure output means for outputting a first fluid pressure proportionate to a vehicle speed; and a second fluid pressure output means for outputting a second fluid pressure proportionate to an engine output; and wherein said valve means includes a spool valve body having opposite ends and being movable in a casing between an open position at which fluid pressure from said pressure source is allowed to pass to the direct-coupling mechanism for coupling thereof and a closed position at which passage of fluid pressure from said pressure source to said direct-coupling mechanism is cut off, and a plunger slidable in said casing and placed in separable contact with one end of said spool valve body, said first fluid pressure being applied to said one end of said spool valve body so as to urge said spool valve body towards its open position and said second fluid pressure being applied to said one end via said plunger, whereby when said first fluid pressure becomes higher than the second fluid pressure, said plunger is separated from said spool valve body and said first fluid pressure additionally acts on a working area of the spool valve body on which said second fluid pressure acts when the plunger abuts the spool valve body, thereby increasing the fluid pressure supplied to the direct-coupling mechanism.

2. The device according to claim 1, wherein said valve means further has a spring which urges said plunger into contact with said spool valve body.

3. The device according to claim 1, wherein an internal pressure of the fluid torque converter acts in a direction to release coupling of the input and output menbers against said fluid pressure supplied to the direct-coupling mechanism, and another valve means is provided to reduce said internal pressure when said fluid pressure applied to the direct-coupling mechanism increases.

4. The device according to claim 1, further comprising a second valve means which is interposed between said first-mentioned valve means and said direct-coupling mechanism and is adapted to cut off supply of fluid pressure from said first mentioned valve means to said direct-coupling mechanism when said second fluid pressure is below a predetermined level.

5. The device according to claim 1, wherein said plunger is formed to have a diameter smaller than that of the spool valve body.

6. The device according to claim 1, wherein fluid pressure which is fed to the direct-coupling mechanism is applied to the other end of said spool valve body.

* * * * *